United States Patent
Kageyama

[11] Patent Number: 6,095,923
[45] Date of Patent: Aug. 1, 2000

[54] PROPELLER SHAFT

[75] Inventor: Hayashi Kageyama, Tochigi, Japan

[73] Assignee: Viscodrive Japan Ltd.

[21] Appl. No.: 09/064,940

[22] Filed: Apr. 22, 1998

[30] Foreign Application Priority Data

Apr. 23, 1997 [JP] Japan ................................ 9-106207

[51] Int. Cl.⁷ .................................................. F16D 3/80
[52] U.S. Cl. .............................................. 464/24; 464/97
[58] Field of Search ................................ 464/24, 97, 113, 464/160, 182; 192/56.3

[56] References Cited

U.S. PATENT DOCUMENTS

| | | | |
|---|---|---|---|
| 2,738,660 | 3/1956 | Gail | 464/24 |
| 3,020,775 | 2/1962 | Musser | 464/97 |
| 3,062,023 | 11/1962 | Stolworthy | 464/97 |
| 3,350,900 | 11/1967 | Harrison | 464/24 |
| 3,890,803 | 6/1975 | Neal et al. | 464/97 |
| 4,048,872 | 9/1977 | Webb | 464/24 |
| 4,082,139 | 4/1978 | Davis | 464/24 |
| 4,365,686 | 12/1982 | Orain | 464/113 |
| 4,774,847 | 10/1988 | Breitweg | 464/97 |
| 5,310,382 | 5/1994 | Guimbrtiere | 464/24 |
| 5,330,038 | 7/1994 | Haaka | 464/24 |

FOREIGN PATENT DOCUMENTS 2631399  11/1989  France ................................ 464/97

*Primary Examiner*—Terry Lee Melius
*Assistant Examiner*—Greg Binda
*Attorney, Agent, or Firm*—Graham & James LLP

[57] ABSTRACT

A propeller shaft comprises two torque transmission members, a viscous fluid damper and a torsion bar which are arranged in parallel between the torque transmission members, and a stopper for restricting the maximum torsion angle of the torsion bar. Thus, torsional vibration characteristic is adjusted in a wide range. Accordingly, a vibration a and noise in a power transmission system can be prevented, and also, a starting acceleration performance of a vehicle can be improved.

11 Claims, 4 Drawing Sheets

PROPELLER SHAFT

BACKGROUND OF THE INVENTION

The present invention relates to a propeller shaft which is arranged in a power train (drive line) of a vehicle, and in particular, to a propeller shaft which can adjust a torsional resonance point or the like.

In general, a great vibration and a noise are generated and made in the case where torsional vibration characteristic of a propeller shaft of a vehicle is improper and a torsional resonance point of the power train and a normally rotational speed of the propeller shaft are coincident.

If a torsional rigidity of the propeller shaft is too high, it is hard to make a connection (conjunction) of a clutch between an engine and a transmission; for this reason, a starting acceleration performance of a vehicle lowers. Further, when the vehicle is in an inertia running state, a torque is not applied to the propeller shaft; for this reason, a so-called lash noise (resulting from rattling and contact of gears) is made at a portion where gears engage with each other.

In order to solve these problems as described above, there is a need of absorbing a torsional vibration of the propeller shaft and lowering a torsional rigidity so as to adjust torsional vibration characteristic.

In this related art, there are a double structure special shaft, and a torque variation absorbing fly-wheel disclosed in Japanese Unexamined Utility Model Publication No. 59-108848, etc.

The aforesaid double structure special shaft has an outer steel pipe and an inner steel pipe penetrating through the outer steel pipe. These steel pipes are connected to each other by means of rubber. Further, one and another sides of respective outer and inner steel pipes are individually connected with a coupling joint. In the special shaft, a torsional rigidity is lowered by the flexibility of rubber, so that torsional vibration characteristic can be improved.

Moreover, the aforesaid torque variation absorbing fly-wheel is called as a double mass fly-wheel. The double mass fly-wheel is composed of a pair of fly-wheels, a coil spring for connecting fly-wheels to each other, and the like. In the torque variation absorbing fly-wheel, the torsional rigidity is lowered by the flexibility of the coil spring and the inertia of both fly-wheels, so that torsional vibration characteristic can be improved.

However, in the case of the special shaft, the torsional vibration characteristic is limited depending upon a flexible rate determined by a property of rubber and a thickness thereof; for this reason, it is impossible to make a torsional angle great. Thus, a range of adjusting the torsional vibration characteristic is narrow.

In the case of the torque variation absorbing fly-wheel, the range of adjusting the torsional vibration characteristic is narrow like the case of the special shaft, and further, the structure is complicated; for this reason, the cost is high.

Neither special shaft nor torque variation absorbing fly-wheel has a function of obtaining a desired torsional vibration characteristic.

For these reasons, neither special shaft nor the torque variation absorbing fly-wheel can sufficiently solve the aforesaid problems relative to the propeller shaft.

SUMMARY OF THE INVENTION

In accordance with the teachings of this invention, a propeller shaft is provided that can adjust the torsional vibration characteristic within a wide range, prevent a vibration and noise from being made in a power train, and improve starting acceleration performance of a vehicle.

The propeller shaft includes two torque transmission members, a viscous fluid damper and a torsion bar that are arranged in parallel between the torque transmission members, and a stopper for restricting the maximum torsion angle of the torsion bar.

In the propeller shaft, as a torque transmitted between the two torque transmission members gradually increases, the torsion angle of the torsion bar also increases. When the torsion angle of the torsion bar becomes greater than a predetermined value (the maximum torsion angle), the stopper is actuated so as to restrict the torsion of the torsion bar. The torque increased after stopper actuation is then transmitted via the stopper. The torsion of the torsion bar is restricted by means of the stopper, so that the torsion bar is protected.

Before the stopper is actuated, in the case where the torque increases and decreases and a first and second relative rotation members make a relative rotation, vibration is absorbed by both viscosity of the viscous fluid of the viscous fluid damper, and torsion of the torsion bar. More specifically, the rigidity of the propeller shaft is properly reduced by the torsion bar, and a fine vibration in a rotating direction is effectively absorbed by the viscous fluid damper.

As described above, two kinds of damper mechanisms (a viscous fluid damper and a torsion bar) having different characteristics are arranged in parallel between the two torque transmission members. Thus, characteristics by both damper mechanisms are independently developed or mutually compensated, allowing a wide range for adjusting torsional vibration characteristics. Therefore, by setting a torsional resonance point of a power train of a vehicle lower than a normally rotational speed of the propeller shaft, vibration and noise can be effectively prevented.

Further, the torsional rigidity of the propeller shaft is lowered, so that connection of a clutch is easily made, thus improving starting acceleration performance. Moreover, when the vehicle is in an inertial running state, even if the torque is not applied to the propeller shaft, it is possible to prevent lash noise in the gear engaging portion.

The propeller shaft of the present invention is constructed as a unit with the viscous fluid damper and the torsion bar incorporated therein so that assembling, removal, replacement, and the like are readily performed. By applying the viscous fluid damper to the propeller shaft, the viscous fluid damper has a wide range of uses and a cost reduction of the viscous fluid damper itself is achieved.

A more complete understanding of the propeller shaft will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENTS

Embodiments according to the present invention will be described below with reference to the accompanying drawings.

Figure 1:
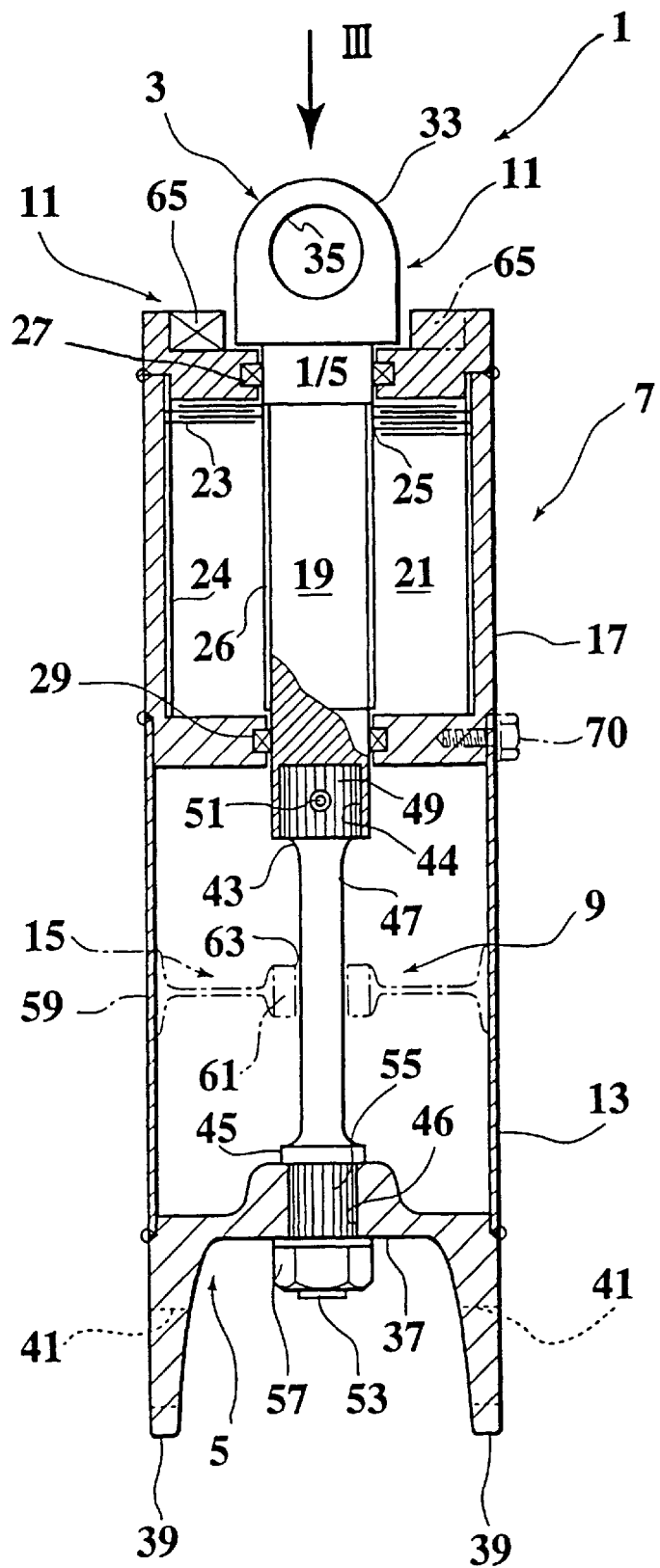
FIG. 1 is a cross-sectional view showing a propeller shaft according to a first embodiment of the present invention.

A first embodiment of the present invention will be described with reference to FIG. 1 to FIG. 4. FIG. 1 shows a propeller shaft 1 according to this first embodiment. In these figures, members, to which no reference numeral is given, are omitted in their illustration.

As shown in FIG. 1, a propeller shaft 1 comprises a one-side torque transmission member (first torque transmission member) 3, another-side torque transmission member (second torque transmission member) 5, a viscous fluid damper 7, a torsion bar 9, a stopper 11, a cylindrical member 13, a vibration stopper member 15, and the like.

The viscous fluid damper 7 has a cylindrical housing 17 (second relative rotating member), a shaft member (first relative rotating member) 19 arranged in the center of the cylindrical housing 17, a viscous fluid, a pressure chamber 21, a plurality of disk-like outer plates (second resistance member) 23, and a plurality of disk-like inner plates (first resistance member) 25.

The pressure chamber 21 is formed between the cylindrical housing 17 and the shaft member 19. A viscous fluid is encapsulated in the pressure chamber 21.

The outer and inner plates 23 and 25 are arranged in the pressure chamber 21 so as to alternately overlap each other along a rotary shaft direction (the shaft member 19 direction, hereinafter, referred to as axial direction). An inner circumferential surface of the housing 17 is formed with a plurality of grooves 24 along the axial direction. The outer plates 23 respectively fitted into these grooves 24, and are arranged so as to be movable along the axial direction. An outer circumferential surface of the shaft member 19 is formed with a plurality of grooves 26 along the axial direction. The inner plates 25 respectively are fitted into these grooves 26, and are arranged so as to be movable along the axial direction.

X-rings 27 and 29 (seal having an X-shaped cross section) are arranged on opposite ends of the pressure chamber 21 between the housing 17 and the shaft member 19. These X-rings 27 and 29 permit a relative rotation of the housing 17 and the shaft member 19, and prevent a leakage of viscous fluid from the pressure chamber 21.

Figure 2:
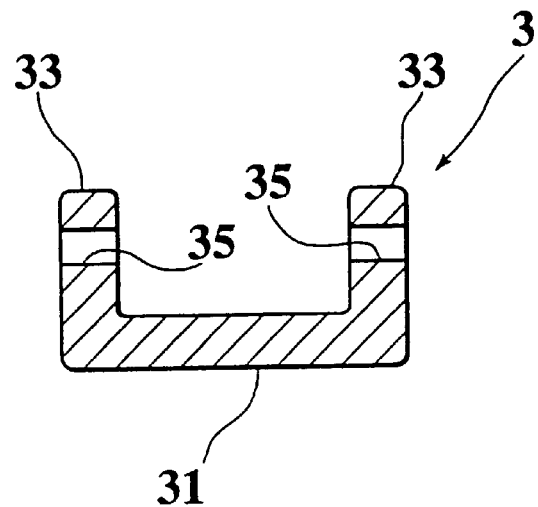
FIG. 2 is a cross sectional view of one-side torque transmission member used in each embodiment.
Figure 3:
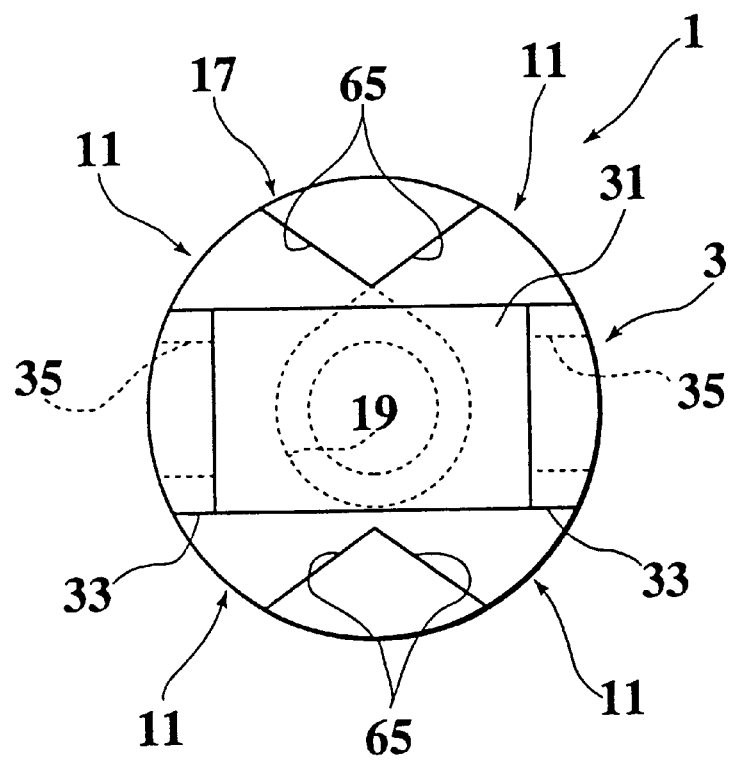
FIG. 3 is a view viewed from an arrow III of FIG. 1.

As shown in FIG. 2 and FIG. 3, one-side torque transmission member 3 is formed into a substantially U-letter shape, and has a proximal portion 31 and two arms 33,33 projecting from both ends of the proximal portion 31. The proximal portion 31 is fixed on one end face of the shaft member 19 of the viscous fluid damper 7. These arms 33 are individually formed with a hole 35 for making a connection with a mating side shaft member of a power transmission system of a vehicle.

As shown in FIG. 1, another-side torque transmission member 5 is formed into a substantially U-letter shape, and has a proximal portion 37 and two arms 39,39 projecting from both ends of the proximal portion 37. These arms 39 are individually formed with a hole 41 for making a connection with a mating side shaft member of the power transmission system of the vehicle.

The torsion bar 9 is composed of connective portions 43 and 45 at its opposite ends and a small-diameter portion 47 formed between these connective portions. These connective portions 43 and 45 are formed with spline portions 49 and 55 at their outer circumferential faces, individually. The other end of the shaft member 19 of the viscous fluid damper 7 is formed with an engaging hole 44 having a spline-shaped inner circumferential surface. When one-side connective portion 43 is inserted into the engaging hole 44 of the shaft member 19, the spline portion 49 engages with the inner circumferential surface of the engaging hole 44, so that the relative rotation of the shaft member and the torsion bar can be prevented. In this state, a spring pin 51 is penetrated through one-side connective portion 43 and the shaft member 19, so that one-side connective portion 43 can be prevented from coming off from the engaging hole 44. On the other hand, the proximal portion 37 of another-side torque transmission member 5 is formed with an engaging hole 46 having a spline-shaped inner circumferential surface. An end portion of another-side connective portion 45 is provided with a screw portion 53. When another-side connective portion 45 is inserted into the engaging hole 46 of another-side torque transmission member 5, the spline portion 55 engages with the inner circumferential surface of the engaging hole 46 so that the relative rotation of the torsion bar and the torque transmission member 5 can be prevented. In this state, a nut 57 is screwed into the screw portion 53, so that another-side connective portion 45 can be prevented from coming off from the engaging hole 46.

In the manner as described above, the torsion bar 9 is connected between the spline portion 49;55 and the engaging holes 44;46 so as to be freely attached and detached. Therefore, it is possible to easily perform a replacement of other torsion bar having different characteristic.

The torsion bar 9 is attached to the cylindrical member 13 in the manner as described above, and thereafter, the cylindrical member 13 is welded to the housing 17 of the viscous fluid damper 7 and another-side torque transmission member 5 to connect these members.

As described above, one-side torque transmission member 3 and another-side torque transmission member 5 are connected by means of the torsion bar 9 and the viscous fluid damper 7 which are arranged in parallel.

An outer proximal portion of the vibration stopper member 15 is fixed onto the inner surface of the cylindrical member 13. A slight gap 63 is defined between a vibration stopper portion 61 and the small-diameter portion 47 of the torsion bar 9. This gap 63 permits a rotation of the torsion bar 9 (small-diameter portion 47), and serves to prevent the torsion bar 9 from being vibrated.

As shown in FIG. 3, the stopper 11 is composed of four projecting portions (second abutting portion) 65 on the outer surface of the cylindrical housing 17 of the viscous fluid damper 7, and arms (first abutting portion) 33 of one-side torque transmission member 3. These projecting portion 65 and arm 33 abut against each other in their rotating direction, and thereby, the maximum torsion angle of the torsion bar 9 is restricted.

As described above, the stopper 11 is arranged outside the propeller shaft 1.

When a torque transmitted between the torque transmission members 3 and 5 is smaller than a predetermined value and is constant, the torque is transmitted through the shaft member 19 and the torsion bar 9.

When a torque transmitted between the torque transmission members 3 and 5 is smaller than a predetermined value and varies, the torsion angle of the torsion bar 9 increases and decreases, and then, the housing 17 and the shaft member 19 make a relative rotation. At this time, a shearing stress is generated in the viscous fluid by the outer and inner plates 23 and 25. Thus, the torque is transmitted through the shaft member 19 and the torsion bar 9, and further, is transmitted through the shaft member 19, the inner plate 25, the outer plate 23, the housing 17 and the cylindrical member 13. In other words, the torque is transmitted by means of the torsion bar 9 and the viscous fluid damper 7. Moreover, at this time, vibration in rotating direction is absorbed by the viscosity of viscous fluid between the housing 17 and the shaft member 49.

When the torque transmitted between the torque transmission members 3 and 5 becomes not less than a predetermined value and the torsion angle of the torsion bar 9 becomes great, the arms 33 of one-side torque transmission member 3 are abutted against the projecting portions 65 so as to actuate the stopper 11. Thus, if the torque exceeds the predetermined value, the torque is transmitted through the stopper 11, the housing 17 and the cylindrical member 13.

As described above, when the torque is smaller than the predetermined value and varies, the stopper is 11 not actuated, and vibration is absorbed by both viscosity of the viscous fluid of the viscous fluid damper 7 and the torsion of torsion bar 9. In particular, the rigidity of the propeller shaft 1 is properly reduced by means of the torsion bar 9, and a fine vibration in the rotating direction is effectively absorbed by means of the viscous fluid damper 7.

Further, when the torque is not less than the predetermined value, the stopper 11 is actuated, and the torsion angle of the torsion bar 9 is restricted so that the torsion bar 9 is protected.

Figure 4:
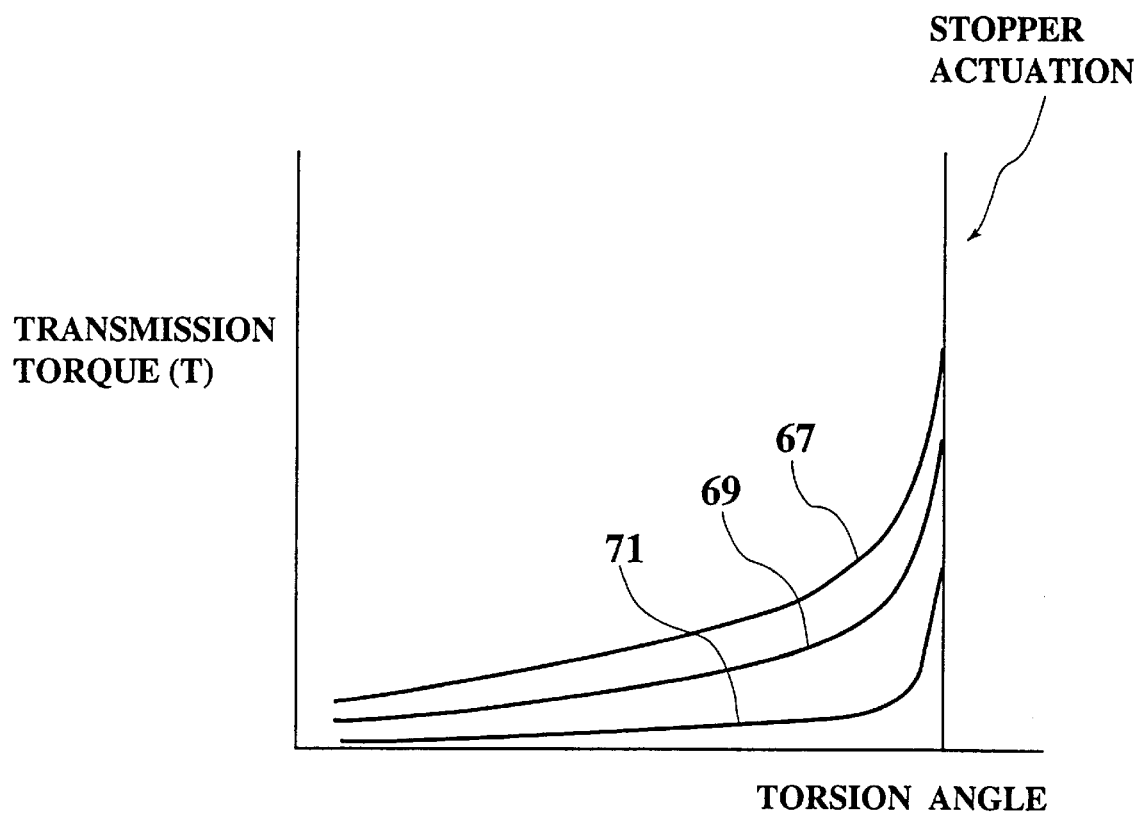
FIG. 4 is a graph showing characteristics in the case where different torsion bars are used in each embodiment.

Curved lines 67, 69 and 71 shown in FIG. 4 show a transmission torque (T) between the torque transmission members 3 and 5 and a torsion angle in the propeller shaft 1.

As described above, the torsion bar 9 is replaceable, and the aforesaid curved lines 67, 69 and 71 individually show characteristics in the case where three kinds of torsion bars 9 having different small-diameter portions 47 are used. The small-diameter portion 47 of the torsion bar 9 becomes gradually small in the order of the curved lines 67, 69 and 71.

As shown by these curved lines 67, 69 and 71, the greater the torsion angle becomes, the more the transmission torque (T) increases. Further, as the torsion angle gradually approaches the elastic limit of the torsion bar, the transmission torque (T) suddenly rises up (increases). At this time, the stopper 11 is actuated, and then, a torque transmission is performed so that the torsion bar 9 is protected.

Thus, it is possible to vary characteristic of the propeller shaft 1 by replacing the torsion bar 9.

The propeller shaft 1 thus constructed has the following effects.

In the propeller shaft 1, two kinds of damper mechanisms (viscous fluid damper 7, torsion bar 9) having different characteristics are arranged in parallel between the torque transmission members 3 and 5. Thus, characteristics by both damper mechanisms are independently and additionally developed, or are mutually compensated. As a result, torsional vibration characteristics such as torsional rigidity and vibration absorbing function are adjusted in a wide range.

Therefore, it is possible to set a torsional resonance point of a power train of a vehicle lower than a normally rotational speed of the propeller shaft 1, so that vibration and noise can be effectively prevented.

The torsional rigidity of the propeller shaft 1 is lowered, so that the connection of clutch is easy to be made; therefore, a starting acceleration performance can be improved. Further, when the vehicle is in an inertial running state, even if the torque is not applied to the propeller shaft 1, it is possible to prevent lash noise from being made in the gear engaging portion.

The torsion bar 9 is replaceable, so that a desired characteristic can be obtained by freely combining the viscous fluid damper 7 and various torsion bars 9. As a result, torsional vibration characteristic can be adjusted in a wide range.

Thus, the propeller shaft 1 is widely applicable to various vehicles, and a reduction of cost can be achieved by mass production.

The vibration of the torsion bar 9 is prevented by means of the vibration stopper member 15, so that the vibration of the propeller shaft 1 can be further reduced. Further, by using the vibration stopper member 15, vibration is prevented even if the torsion bar 9 is thin, so that a thin torsion bar can be replaced. Therefore, a selective range of characteristic can be further widened.

Even if the torsion bar 9 is formed thin, the torsion bar 9 is protected by means of the stopper 11 from a excessive torsion.

Since the stopper 11 is arranged outside the propeller shaft 1, adjustment is easy, more specifically, it is possible to actuate the stopper 11 at a small torsion angle of the torsion bar 9 or to actuate the stopper 11 at a large torsion angle thereof. Further, it is possible to readily adjust an actuating torsion angle in accordance with the replaced torsion bar 9 having different characteristic.

One-side torque transmission member 3 is connected to another-side torque transmission member 5 via the shaft member 19 of the viscous fluid damper 7 and the torsion bar 9. The viscous fluid damper 7 and the torsion bar 9 are functionally arranged in parallel, and are structurally arranged in the axial direction. Moreover, the disk-like plates 23 and 25 of the viscous fluid damper 7 are arranged in the axial direction.

For this reason, it is possible to make small a diameter of the propeller shaft 1, and to make small an arrangement space in a diametrical direction.

The propeller shaft 1 is constructed as a unit in a manner that viscous fluid damper 7 and the torsion bar 9 are incorporated therein; therefore, assembling, removal, replacement and the like are readily performed.

In the manner as described above, by applying the viscous fluid damper 7 to the propeller shaft 1, the viscous fluid damper 7 is used for various purposes, and a cost reduction of the viscous fluid damper 7 itself is achieved.

When the torque increases and decreases before the stopper 11 is actuated and the housing 17 and the shaft member 19 make a relative rotation, a part of the torque transmitted by the torsion bar 9 is transmitted between the housing 17 and the shaft member 19 via the viscous fluid.

For this reason, a part of a load onto the torsion bar 9 by a sudden increase and decrease of torque is dispersed and absorbed in the viscous fluid damper 7, so that the torsion bar 9 is further protected.

Also, not only the cylindrical member 13 and the housing 17 are connected to each other by welding, but also they may be connected to each other by means of a bolt 70 shown by a two-dotted chain line in FIG. 1. In this case, workability for replacing the torsion bar 9 is improved as compared with the case of welding.

Figures 5, 6:
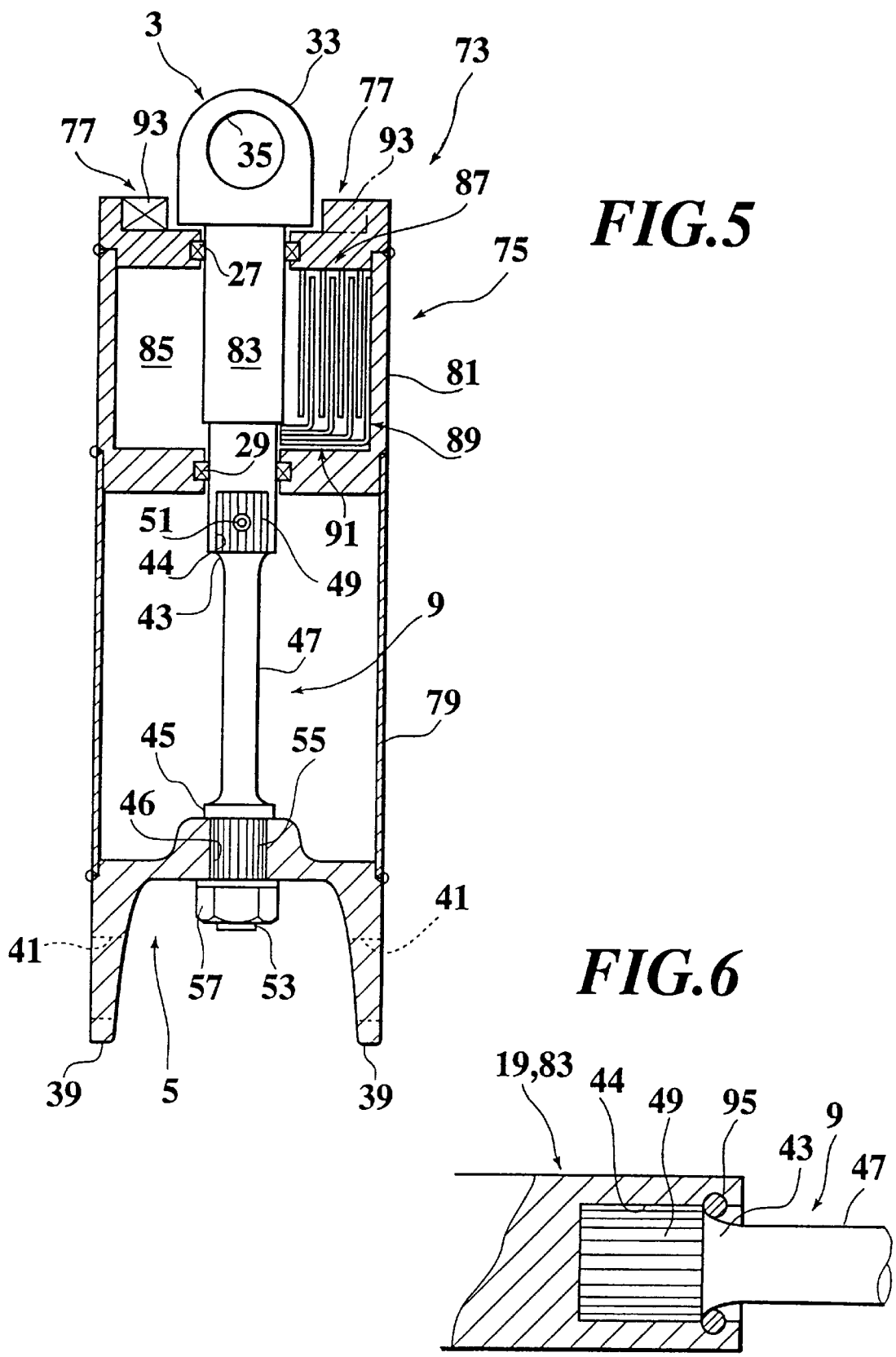
FIG. 5 is a cross-sectional view showing a propeller shaft according to a second embodiment.
FIG. 6 is a cross-sectional view showing a stopper of a torsion bar different from each embodiment.

Next, A second embodiment of the present invention will be described below with reference to FIG. 5. FIG. 5 shows a propeller shaft 73 according to this embodiment. In this figure, members, to which no reference numeral is given, are omitted in their illustration. Also, in the explanation of this second embodiment and in FIG. 5, like reference numerals are used to designate the same functional member as the first embodiment, and a repeated explanation for these functional members is omitted.

As shown in FIG. 5, the propeller shaft 73 comprises one-side torque transmission member (first torque transmission member) 3, another-side torque transmission member (second torque transmission member) 5, a viscous fluid damper 75, a torsion bar 9, a stopper 77, a cylindrical member 79 and the like.

A pressure chamber 85 is formed between a housing (second relative rotation member) 81 of the viscous fluid damper 75 and a shaft member (first relative rotation member) 83 arranged in the center thereof. A viscous fluid is encapsulated in the pressure chamber 85.

In an interior of the pressure chamber 85, cylindrical plate groups (first and second resistance members) 89 and 87 are arranged. These plate groups 87 and 89 comprise different-diameter cylindrical plates alternately arranged in a diametrical direction.

The plate group 87 is fixed to the housing 81; on the other hand, the plate group 89 is fixed to the shaft member 83 by means of an axial-direction engaging portion 91 provided in each plate. The viscous fluid is prevented from leaking from the pressure chamber 85 by means of X-rings 27 and 29 arranged between the housing 81 and the shaft member 83.

A proximal portion 31 of one-side torque transmission member 3 is fixed to the shaft member 83 of the viscous fluid damper 75. The stopper 77 is composed of four projecting portions 93 provided in the housing 81 of the viscous fluid damper 75 and arms 33 of one-side torque transmission member 3, and is arranged outside the propeller shaft 73. These projecting portions 93 and arms 33 are abutted against each other in their both (normal and reverse) rotating direction, and thereby, the maximum torsion angle of the torsion bar 9 is restricted.

One-side connective portion 43 of the torsion bar 9 is connected to the shaft member 83 of the viscous fluid damper 75 via a spline portion 49, and is prevented from coming off by means of a spring pin 51. On the other hand, another-side connective portion 45 is connected to the another-side torque transmission member 5 via a spline portion 55, and is prevented from coming off by means of a nut 57 screwed into a screw portion 53.

As seen from the above explanation, the torsion bar 9 connected via the spline portions 49 and 55 is removable (attachable and detachable), and is replaceable with a torsion bar having different characteristic.

The torsion bar 9 is attached to the cylindrical member 79, and thereafter, the cylindrical member 79 is welded to the housing 81 of the viscous fluid damper 75 and another-side torque transmission member 5 to connect these members.

In this manner, one-side torque transmission member 3 and another-side torque transmission member 5 are connected to each other by means of the torsion bar 9 and the viscous fluid damper 75 which are arranged in parallel.

When a torque transmitted between the torque transmission members 3 and 5 is smaller than a predetermined value is constant, the torque is transmitted through the shaft member 83 and the torsion bar 9.

When the torque is smaller than the predetermined value and varies, the housing 81 and the shaft member 83 make a relative rotation, and then, a shearing stress is generated in a viscous fluid by means of plate groups 87 and 89, respectively. Thus, the torque is transmitted via the shaft member 83 and the torsion bar 9, and further, is transmitted between plate groups 87 and 89. In other words, the torque is transmitted by means of the torsion bar 9 and the viscous fluid damper 75. Further, at this time, a vibration in a rotating direction is absorbed by the viscosity of viscous fluid between the housing 81 and the shaft member 83. Thus, the vibration is absorbed by two characteristics, that is, the viscosity of viscous fluid of the viscous fluid damper 75 and the torsion of the torsion bar 9. In particular, the rigidity of the propeller shaft 1 is properly reduced by means of the torsion bar 9, and a fine vibration in a rotating direction is effectively absorbed by means of the viscous fluid damper 75.

When the torque becomes not less than the predetermined value and the torsion angle of the torsion bar 9 becomes great, the arm 33 of one-side torque transmission member 3 abuts against the projecting portion 93 to actuate the stopper 77. Thus, the torque exceeding the predetermined value is transmitted via the stopper 77, the housing 81 and the cylindrical member 79. More specifically, the torsion angle of the torsion bar 9 is restricted by means of the stopper 77, so that the torsion bar 9 can be protected.

Like the curved lines 67, 69 and 71 of the propeller shaft 1 shown in FIG. 4, in the propeller shaft 73, the greater the torsion angle becomes, the more the transmission torque (T) between the torque transmission members 3 and 5 increases. Further, when the torsion angle gradually approaches the elastic limit of the torsion bar 9 and the transmission torque (T) suddenly rises up (increases), the stopper 77 is actuated, so that the torsion bar 9 is protected.

Thus, it is possible to greatly adjust characteristic of the propeller shaft 73 by replacing the torsion bar 9 with a torsion bar having different small-diametrical portion 47.

The propeller shaft 73 thus constructed has the following effects.

In the propeller shaft 73, two kinds of damper mechanisms (viscous fluid damper 75, torsion bar 9) having different characteristics are arranged in parallel. Thus, characteristics by both damper mechanisms are additionally developed, or are mutually compensated. As a result, torsional vibration characteristics are adjusted in a wide range.

Therefore, by setting a torsional resonance point of a power train of a vehicle lower than a normally rotational speed of the propeller shaft 73, vibration and noise can be effectively prevented.

The torsional rigidity of the propeller shaft 73 is lowered, so that the connection of clutch is easy to be made; therefore, a starting acceleration performance can be improved. Further, when the vehicle is in an inertial running state, even in the case where the torque is not applied to the propeller shaft 73, it is possible to prevent lash noise from being made in the gear engaging portion.

The torsion bar 9 is replaceable, so that a desired characteristic can be obtained by freely combining the viscous fluid damper 75 and various torsion bars 9. As a result, torsional vibration characteristic can be adjusted in a further wide range.

Thus, the propeller shaft 73 is widely applicable to various vehicles, and a reduction of cost can be achieved.

Even if the torsion bar 9 is formed thin, the torsion bar 9 is protected by means of the stopper 77 from a excessive torsion.

Since the stopper 77 is arranged outside the propeller shaft 73, adjustment is easy; more specifically, it is possible to actuate the stopper 11 at a small torsion angle of the torsion bar 9 or to actuate the stopper 77 at a large torsion angle thereof. Further, it is possible to readily adjust the torsion angle in accordance with the torsion bar 9 having different characteristic.

The torque transmission members 3 and 5 are connected to each other via the shaft member 83 of the viscous fluid damper 75 and the torsion bar 9. The viscous fluid damper 75 and the torsion bar 9 are functionally arranged in parallel, and are structurally arranged in the axial direction. Thus, the propeller shaft has a small diameter, so that an arrangement space can be made small in a diametrical direction.

In the viscous fluid damper 75, since the cylindrical plate groups 87 and 89 are arranged in the diametrical direction, sufficient vibration absorbing function can be obtained even if the propeller shaft 73 is made short in the axial direction. Therefore, the propeller shaft 73 is further made short in the axial direction, so that an arrangement space in the axial space can be made small.

The propeller shaft 73 is constructed as a unit in a manner that viscous fluid damper 75 and the torsion bar 9 are incorporated therein; therefore, assembling, removal, replacement and the like are readily performed.

By applying the viscous fluid damper 75 to the propeller shaft 73, the viscous fluid damper 75 is used for various purposes, and a cost reduction of the viscous fluid damper 75 itself is achieved.

Further, as shown in FIG. 6, the torsion bar 9 and the shaft members 19 and 83 may be prevented from coming off by means of a stopper ring 95.

Further, in place of shaft members 19 and 83 of the first and second embodiments, by using a cylindrical shaft member, the torsion bar 9 may be penetrated through a hollow portion of the shaft member. Whereby the viscous fluid damper is arranged in line (parallel) with the torsion bar 9 along the diametrical direction.

With the aforesaid construction, the viscous fluid damper is arranged in line with the torsion bar 9 along the diametrical direction, so that the propeller shaft can be made short. Therefore, this is advantageous in the case of arranging the propeller shaft in a narrow space.

What is claimed is:

1. A propeller shaft for torque transmission, comprising:
   first and second torque transmission members in opposition to each other;
   a torsion bar connecting the first torque transmission member and the second torque transmission member, the torsion bar rotating integrally with the first and second torque transmission members so as to perform a function of torque transmission;
   a viscous fluid damper including first and second relative rotation members and a viscous fluid, the first and second relative rotation members being individually connected to the first and second torque transmission members, respectively, the first relative rotation member rotating integrally with the first torque transmission member, the second relative rotation member rotating integrally with the second torque transmission member, with a viscous fluid between the relative rotation members to transmit force parallel to the torsion bar, so that a shearing stress of the viscous fluid generated between the relative rotation members absorbs a vibration in a rotating direction when the torsion bar is twisted and the relative rotation members make a relative rotation; and
   a stopper for restricting a maximum torsion angle of the torsion bar, wherein the stopper has a first abutting portion on the first torque transmission member and a second abutting portion on the second relative rotation member, with the abutting portions abutted against each other to prevent the torsion bar from being further twisted when the torsion bar is twisted at the maximum torsion angle.

2. The propeller shaft according to claim 1, wherein the viscous fluid damper absorbs the relative rotation so as to perform a function of torque transmission when the torsion bar is twisted and the relative rotation members make the relative rotation.

3. The propeller shaft according to claim 1, wherein the first abutting portion is located on an outer surface of the first torque transmission member, and the second abutting portion is located on an outer surface of the second relative rotation member.

4. The propeller shaft according to claim 1, wherein the torsion bar is detachably connected to the first torque transmission member and to the second torque transmission member.

5. The propeller shaft according to claim 4, wherein the torsion bar engages with the first torque transmission member and the second torque transmission member so that the torsion bar is prevented from relative rotating with respect to the first and second torque transmission members.

6. The propeller shaft according to claim 1, wherein
   the viscous fluid damper includes a pressure chamber, a plurality of disk-like first resistance members in the pressure chamber, and a plurality of disk-like second resistance members in the pressure chamber,
   the pressure chamber is formed between the first and second relative rotation members,
   the viscous fluid is encapsulated in the pressure chamber,
   the first resistance member engages with the first relative rotation member so as to rotate integrally with the first relative rotation member,
   the second resistance member engages with the second relative rotation member so as to rotate integrally with the second relative rotation member,
   the first and second resistance members are arranged so as to alternately overlap each other, and
   the first and second resistance members generate the shearing stress of the viscous fluid when the torsion bar is twisted and the relative rotation members make the relative rotation.

7. The propeller shaft according to claim 6, wherein
   the first and second resistance members alternately overlap each other along an axial direction.

8. The propeller shaft according to claim 6, wherein
   the first and second resistance members alternately overlap each other along a direction intersecting a rotation axis of the torsion bar.

9. The propeller shaft according to claim 1, further comprising a vibration stopper member arranged on an outer circumference of the torsion bar.

10. The propeller shaft according to claim 1, wherein
the first relative rotation member has a shaft shape, and is fixed to the first torque transmission member,
the second relative rotation member has a cylindrical shape covering an outer periphery of the first relative rotation member,
the torsion bar connects the first relative rotation member to the second torque transmission member, and
the viscous fluid damper and the torsion bar are lined up along a rotation axis of the torsion bar.

11. The propeller shaft according to claim 1, wherein the first relative rotation member has a cylindrical shape, and is fixed to the first torque transmission member,
the second relative rotation member has a cylindrical shape covering an outer periphery of the first relative rotation member, and
the torsion bar penetrates through the first relative rotation member.

* * * * *